United States Patent [19]
Sonneborn

[11] 3,831,999
[45] Aug. 27, 1974

[54] LOST MOTION CONNECTION MEANS FOR HYDRAULIC PISTON-CYLINDER DEVICE

[75] Inventor: Lambertus Johannes Sonneborn, Oldenzaal, Netherlands

[73] Assignee: Applied Power Inc., Milwaukee, Wis.

[22] Filed: Dec. 6, 1972

[21] Appl. No.: 312,486

[52] U.S. Cl.............. 296/35 R, 92/52, 92/113, 92/DIG. 4, 180/89 A
[51] Int. Cl.............. B62d 27/06, B62d 33/06
[58] Field of Search....... 296/28 C, 35 R; 180/89 A; 92/52, 113, 129, 131, DIG. 4

[56] References Cited
UNITED STATES PATENTS

| | | | |
|---|---|---|---|
| 1,112,803 | 10/1914 | Jones | 92/113 X |
| 2,581,660 | 1/1952 | Horton | 92/113 X |
| 2,649,842 | 8/1953 | Caldwell et al. | 92/52 |
| 3,039,557 | 6/1962 | Boyce et al. | 180/89 A |
| 3,419,099 | 12/1968 | Brumbaugh et al. | 92/113 X |
| 3,649,066 | 3/1972 | Steiner | 296/35 R |
| 3,667,350 | 6/1972 | Engle | 92/113 |

FOREIGN PATENTS OR APPLICATIONS

| | | | |
|---|---|---|---|
| 186,075 | 9/1955 | Austria | 92/113 |
| 978,964 | 1/1965 | Great Britain | 180/89 A |

Primary Examiner—Robert J. Spar
Assistant Examiner—Leslie J. Paperner
Attorney, Agent, or Firm—James E. Nilles

[57] ABSTRACT

A hydraulic piston-cylinder device or tilt cylinder for tilting a truck cab relative to its chassis to permit access to the engine positioned below the cab comprises lost motion connection means which permit the main piston to remain stationary relative to the cylinder while permitting slight relative movement of the cab and chassis. One end of the cylinder is pivotally connected to the truck chassis by a pin. The cab is provided with a fixed cylindrical pin for connection to the free end of the piston through the lost motion connection means. In one embodiment, the pin slidably engages a slot provided in a connecting member rigidly secured to the free end of the main piston. In a second embodiment, the pin is connected to a cylindrical hole in the connecting member or sleeve which is slidably mounted on the free end of the piston and the connecting member and is further provided with a slot engageable with another cylindrical pin rigidly secured to the free end of the main piston. In a third embodiment, the connecting member is in the form of a small piston which is slidable in an axial bore provided in the free end of the main piston and the free end of the small piston is provided with a cylindrical hole for engagement with the pin on the cab. The fourth embodiment resembles the third embodiment in comprising a small piston but further comprises a fluid passage in the main piston interconnecting the axial bore and the cylinder and further comprises a free hydraulic piston slidably mounted in the bore between the small piston and the port of the passage.

13 Claims, 9 Drawing Figures

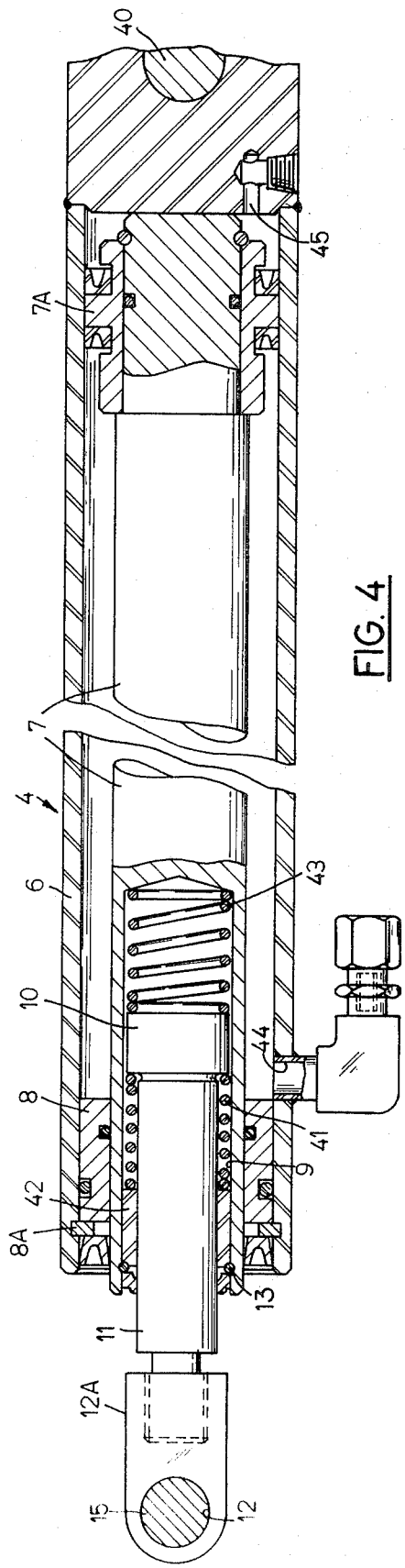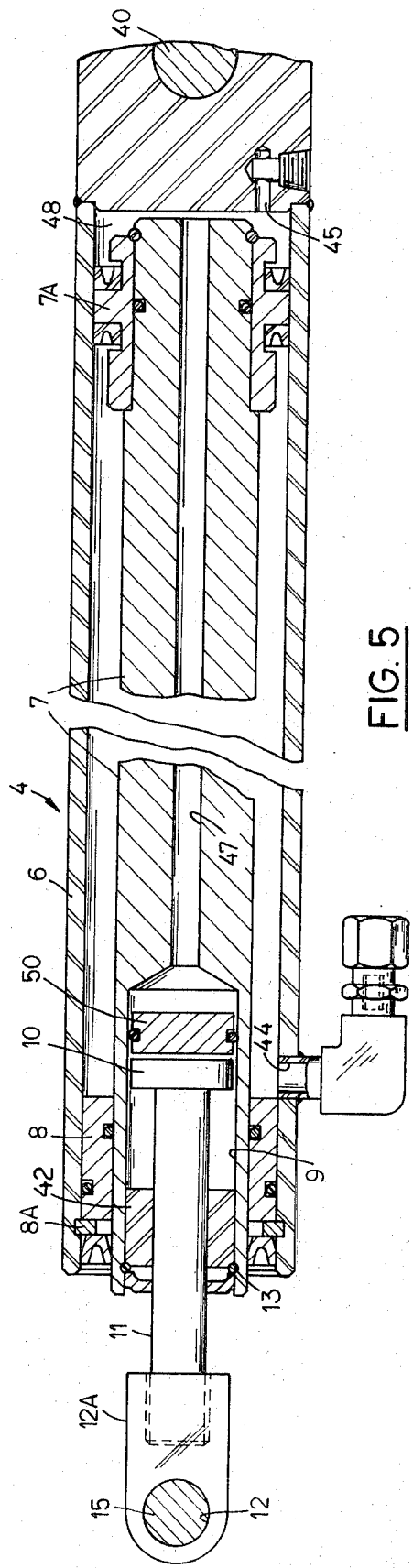
FIG. 4
FIG. 5

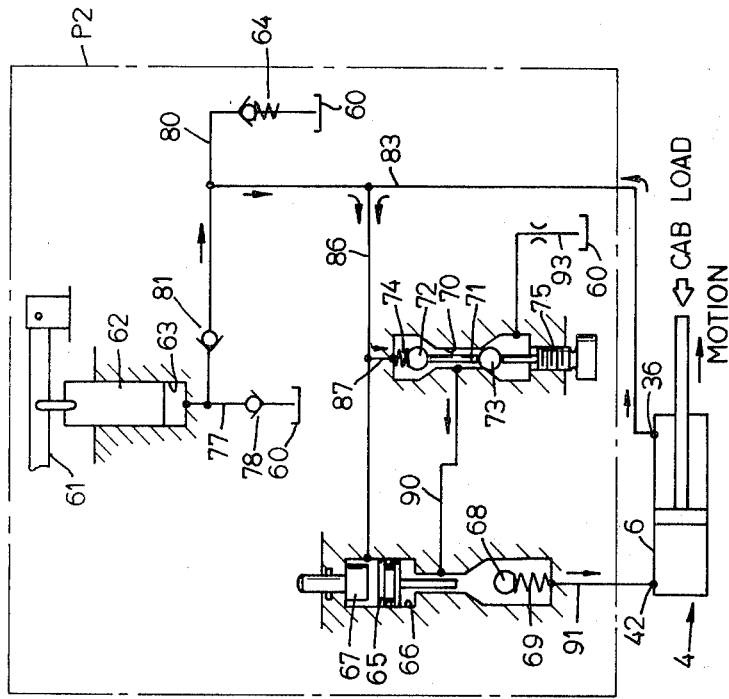
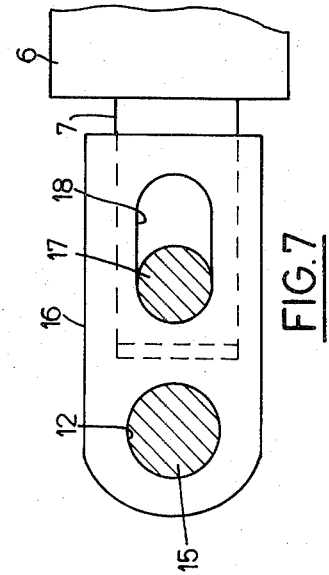
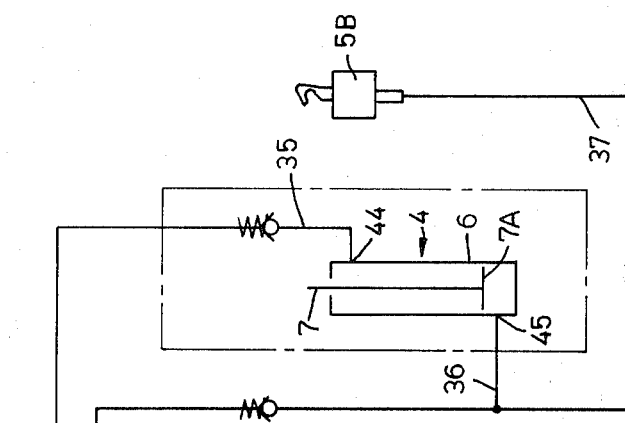
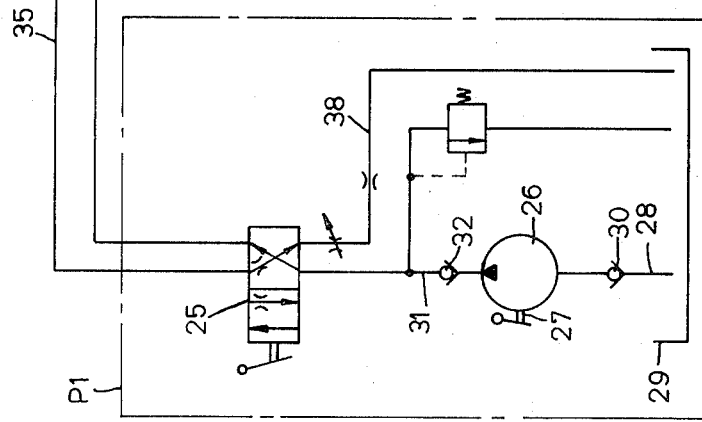
FIG. 9
FIG. 7
FIG. 8
FIG. 6

LOST MOTION CONNECTION MEANS FOR HYDRAULIC PISTON-CYLINDER DEVICE

BACKGROUND OF THE INVENTION

1. Field of Use

This invention relates generally to lost motion connection means for hydraulic piston-cylinder devices such as are used for adjusting the relative angular position of two pivotally connected parts, such parts being attached to the free ends of the piston rod and cylinder, respectively. In particular, the invention relates to such lost motion connection means which enable the piston to remain stationary relative to the cylinder, while slight relative movement of the aforesaid parts in opposite directions is permitted.

2. Description of Prior Art

Some trucks comprise a chassis and a driver's cab pivotably mounted thereon to enable the cab to be tilted to permit access to the engine located below the cab. In such trucks it is the usual practice to provide one or more hydraulic piston-cylinder devices to tilt the cab between its over-the-road position and its full-tilt position or to any position therebetween. It is also common practice to provide a resilient suspension system between the chassis and cab (with or without shock absorbers) to improve the suspension of the cab or the chassis to reduce jarring during over-the-road truck operation and enhance the driver's comfort. The suspension system normally comprises a cab latch mechanism to lock the cab to the chassis while allowing for some relative movement. In such arrangements, several problems can arise.

In some instances, for example, the nature of the hydraulic system for operating the piston-cylinder device is such that fluid trapped in certain parts of the system prevents relative motion between the piston and cylinder of the piston-cylinder device, at least in one direction.

In some instances, while it is desirable to allow for limited relative movement between the cab and chassis in over-the-road truck operation, it is undesirable to transmit the reciprocating motion between the cab and chassis to the piston-cylinder device because such movement eventually causes unnecessary wear on the cylinder walls and piston seals in the piston-cylinder device and necessitates repair and replacement of parts. Heretofore, it was known to provide special linkages between the piston-cylinder device and at least one of its connection points to the chassis or the cab. Such linkages allowed for slight tilting, pivoting or bouncing of the cab relative to the chassis during over-the-road truck operation but prevented such motion from being transmitted to the piston-cylinder device. However, some such special linkages are so constructed that, when the cab is being tilted through its overcenter position, excess play in the linkage may cause severe, undesirable jarring of the truck.

Finally, in some instances the resilient suspension system employs a hydraulically operated damping device and a hydraulically operated cab latch mechanism associated therewith. In such instances, the nature of the hydraulic system for operating these components and the piston-cylinder device is such that reciprocating motion of the cab with respect to the chassis during over-the-road operation is transmitted to the piston-cylinder device causing the latter to act as a pump and eventually resulting in unintended release of the cab latch and tilting of the cab.

It is desirable, therefore, to provide improved lost motion connection means which overcome these and other problems.

SUMMARY OF THE PRESENT INVENTION

The present invention contemplates two relatively movable pivotally connected parts, such as a truck chassis and tilt cab thereon; a hydraulically operated piston-cylinder device for adjusting the relative angular position of the two parts; and lost motion connection means which enable the piston and cylinder to remain relatively stationary to each other while permitting slight relative movement of the parts relative to each other in opposite directions. The lost motion connection means are disposed between a connection point such as a cylindrical pin or first connecting member rigidly mounted on at least one of the parts (chassis or cab) and an associated end of the piston-cylinder device (free end of piston or cylinder). The lost motion connection means comprises a second connecting member mounted on the piston-cylinder device (such as at the free end of the piston) and engaged with the first connecting member (i.e., the pin on the cab).

In one embodiment the second connecting member is rigidly secured to the piston-cylinder device (i.e., to the free end of the piston) and comprises an elongated slot or eyelet engaged with the first connecting member (i.e., the pin on the cab).

In other embodiments, the second connecting member is mounted for relative (sliding) movement on the piston-cylinder device (i.e., at the free end of the piston) and comprises a cylindrical hole in which the first connecting member (i.e., the pin on the cab) is engaged.

In a first one of the said other embodiments, the relatively movable (second) connecting member is in the form of a slidable sleeve connected by means of a pin and slot connection to the piston-cylinder device, i.e., such as an elongated slot in the sleeve engaged with a transversely disposed pin affixed to the piston.

In a second one of the said other embodiments, the relatively movable (second) connecting member is in the form of a small piston slidably mounted in a bore or aperture in the piston-cylinder device i.e., in the free end of the main piston. Preferably, biasing springs are disposed on opposite sides of the small piston to spring load it and take up play and prevent jarring as the cab tilts through overcenter position. The small piston is provided with a piston rod connected outside the bore by means of a hole to, for example, the pin on the cab.

In a third one of the said other embodiment, the relatively movable (second) connecting member is in the form of a small piston slidably mounted in a bore in the free end of the main piston. Furthermore, the main piston is provided with a passage communicating between the bore and the interior of the cylinder behind the main piston. A hydraulically operated free or second piston is disposed in the bore between the small piston and the passage and acts on the small piston. The small piston is provided with a piston rod connected outside the bore by means of a hole to, for example, the pin on the cab. In operation, hydraulic fluid flow to the cylinder to pump out (extend) the main piston is accompanied by fluid flow through the passage to cause the free piston to move the small piston outwardly of its bore. This arrangement ensures that the small piston assumes a mid-position in its bore when the cab is returned to over-the-road position thereby enabling the small piston to move reciprocably in either direction in response to cab bounce regardless of fluid trapped else where in the system.

Improved lost motion connection means in accordance with the invention are simpler and require less room than prior art devices. Furthermore, in all embodiments of means in accordance with the invention, the possibility of slight movement is provided between the cab and chassis by means built integrally in the piston-cylinder device itself. Therefore, hydraulic piston-cylinder devices incorporating such means are adapted for use by original equipment manufacturers or to replace existing piston-cylinder devices presently installed on trucks. Other advantages will hereinafter appear.

DRAWINGS

FIG. 4 is an enlarged cross-section of a piston-cylinder device showing a first embodiment of a lost motion connection means according to the invention;

FIG. 5 is a side elevation of a second embodiment of the lost motion connection means;

FIG. 6 is a side elevation of a third embodiment of the lost motion connection means;

FIG. 7 is a side elevation of a fourth embodiment of the lost motion connection means;

FIG. 8 is a schematic diagram of a hydraulic circuit for the piston-cylinder device for the truck shown in FIGS. 1 and 2; and FIG. 9 is a schematic diagram of a hydraulic circuit for the piston-cylinder device for the truck shown in FIG. 3.

DESCRIPTION OF PREFERRED EMBODIMENTS

Figure 1:
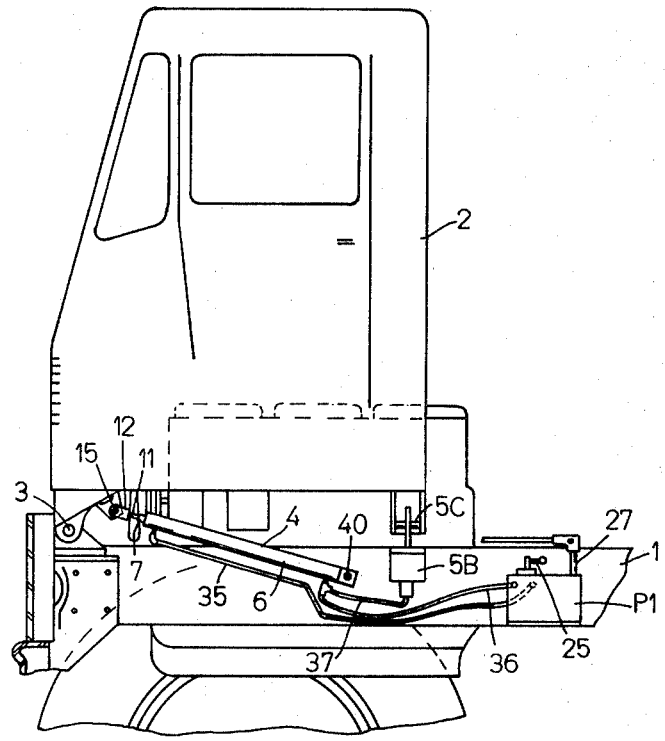
FIG. 1 is a schematic side elevation of the front part of one type of truck having a tiltable driver's cab in accordance with the invention.
Figure 3:
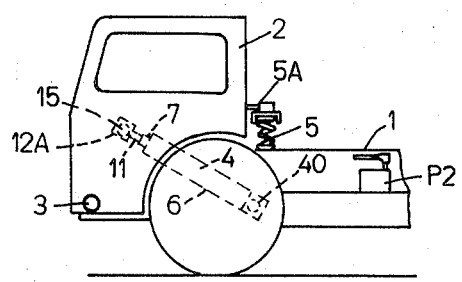
FIG. 3 is a schematic side elevation of the front part of another type of tilt cab truck in accordance with the invention.
Figure 2:
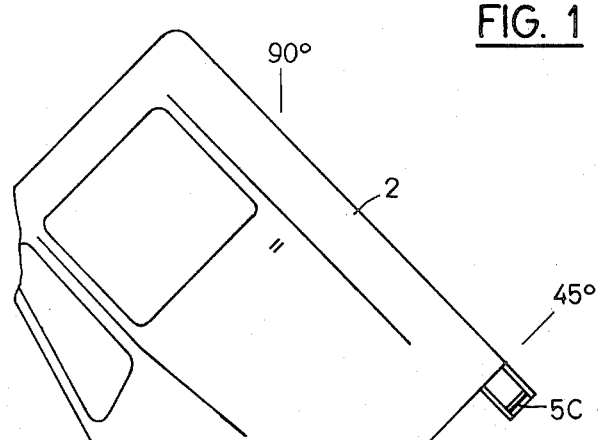
FIG. 2 is another side view of a portion of the truck of FIG. 1, showing the cab tilted forward.
Figure 2:
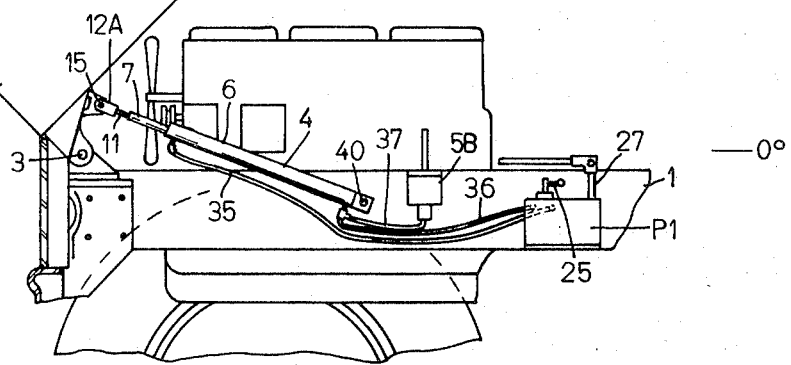

Referring to FIGS. 1, 2 and 3, there is shown a truck comprising a chassis 1 having a driver's cab 2 which is tiltable relative to the chassis by pivoting around a shaft 3. A piston-cylinder device or tilt cylinder 4 is provided between the chassis 1 and the cab 2 for tilting the cab. Cab 2 has an over-the-road (0°) position shown in FIG. 1 and is movable to and from a full-tilt (90°) position through an overcenter (45°) position, as shown in FIG. 2. Cab 2 is movable in response to actuation of device 4. Device 4 for the truck shown in FIGS. 1 and 2 is operated in response to operation of a hydraulic pump unit P1 mounted on chassis 1. Device 4 for the truck shown in FIG. 3 is operated in response to hydraulic pump unit P2, shown in FIG. 3. As FIGS. 8 and 8 show, the units P1 and P2, respectively, comprise the various components which make up the hydraulic system for operating a piston-cylinder device such as 4. Between the driver's cab 2 and the chassis 1 there is provided a spring system connected, for example, to the chassis and on which the driver's cab rests when the cab is in the over-the-road position. In the truck shown in FIG. 3, the spring system takes the form of a spring 5 on which rests an arm 5A which is connected to cab 2. The arm 5A may be mechanically lockable to the spring system and the spring system may comprise a coil spring 5, as shown, or torsion springs, rubber springs or leaf springs. In the type of truck shown in FIGS. 1 and 2, the spring system is embodied in a tilt cab latch mechanism 5B having a hook which engages a pin or bracket 5C attached to cab 2. The spring system allows limited relative movement between the cab 2 and chassis 1 during over-the-road operation of the truck.

In the truck shown in FIG. 3, it is to be understood that the hydraulic system for operating piston-cylinder device 4 is of such a nature that, no matter what position the piston is in relative to the cylinder, the piston-cylinder 4 prevents relative movement of the cab 2 with respect to chassis 1. Consequently, when the cab 2 is in over-the-road or driving position, over-the-road shocks incurred during driving cannot be absorbed without some special measures being taken. As FIG. 9 shows, the hydraulic system comprising unit P2 for the truck shown in FIG. 3 comprises a hydraulic fluid reservoir 60; a manually operable pump comprising a handle 61, a pump piston 62 and a pump cylinder 63; a pressure relief valve 64; an intrinsic safe valve comprising a valve piston 65, a valve cylinder 66, a movable plunger 67, a spring-loaded valve ball 68, and a biasing spring 69; and a directional control valve comprising a chamber 70, a push-rod 71, two valve balls 72 and 73 at opposite ends of rod 71, a biasing spring 74 and a valve adjustment member 75. Chamber 63 is connected to reservoir 60 by a fluid line 77 having a ball check valve 78 therein. Chamber 63 is also connected to reservoir 60 by a fluid line 80 having a ball check valve 81 and pressure relief valve 64 therein. Line 80 is connected, at a point between valves 81 and 64, by a fluid line 83 to pull port 36 of piston-cylinder device 4. Line 83 is connected by a fluid line 86 to chamber 66 of the safe valve on one side of piston 65. Line 86 is also connected by a fluid line 87 to one end of chamber 70 of the control valve on one side of valve ball 72. Chamber 66 of the safe valve is connected on the other side of its piston 65 by a fluid line 90 to chamber 70 of the control valve intermediate of the valve balls 72 and 73. The end of chamber 66 of the safe valve is connected by a fluid line 91 to push port 45 of piston-cylinder device 4. The other end of chamber 70 of the control valve is connected by a fluid line 93 to reservoir 60. Unit P2 operates as hereinafter described.

On the other hand, the type of truck shown in FIGS. 1 and 2 employs, for example, a hydraulic system comprising unit P1 such as is shown schematically in FIG. 8. This system comprises piston-cylinder device 4, cab latch 5B, a control valve 25, and an operating pump 26 having a movable plunger 27. One side of pump 26 is connected by a fluid line 28 to a reservoir 29 and a ball-type check valve 30 is disposed in line 28. The other side of pump 26 is connected by a hydraulic fluid line 31 to valve 25 and a ball-type check valve 32 is disposed in line 31. The two sides of piston-cylinder device 4 are connected by hydraulic lines 35 and 36 to valve 25. Line 36 is connected by a hydraulic line 37 to cab latch 5B. Valve 25 is also connected by a hydraulic fluid line 38 to reservoir 29. When the valve 25 is in the position shown in FIG. 8, as is normally the case when the cab is in over-the-road position, reciprocating movement of piston 7 effected by bouncing cab 2 causes hydraulic fluid to be drawn through both check ball valves 28 and 32 eventually causing the cab latch 5B to be released and the tilt cylinder 4 to jack cab 2 from its over-the-road position toward tilt position. Lost motion connection means in accordance with the present invention prevent such reciprocating motion of the piston-cylinder device 4.

In accordance with the present invention, lost motion connection means are provided between one of the connection points of the piston-cylinder device 4 and the driver's cab 2 or the chassis 1, respectively. For purposes of illustration herein, the lost motion connection means in accordance with the present invention are shown disposed between the connection point i.e., pin 15 on the cab 2, and the free end of the cylinder rod 7; the cylinder 6 being pivotably attached at its free or lower end by a pin 40 to chassis 1.

FIG. 4 shows one embodiment of lost motion connection means in accordance with the invention. Piston-cylinder device 4 comprises a cylinder 6 and a piston rod 7 having a piston 7A. Between rod 7 and cylinder 6 a retainer 8 and ring 8A are provided. The end of piston rod 7 extending beyond cylinder 6 has an aperture or bore 9 which receives a small piston 10 for a piston rod 11. Piston rod 11 extends from bore 9 and is provided with, for example, a threadedly attached connecting member or fork 12A having a cylindrical hole or connection eyelet 12 which pivotably engages a cylindrical pin or connecting member 15 which is provided on cab 2. Snap ring 13 and a bearing 42 are provided at the end of the bore 9 to limit outward movement of piston 10 and its piston rod 11.

A coiled compression spring 41 is disposed in bore 9 between piston 10 and bearing 42 in the bore. Another coiled compression spring 43 is disposed in bore 9 between piston 10 and the end wall of the bore. Springs 41 and 43 served to smooth and cushion the relative movement of piston 10 with respect to piston rod 7 as cab 2 is being tilted through its overcenter point.

Cylinder 6 is provided with fluid ports 44 and 45 through which hydraulic fliud enters and leaves the cylinder to effect movement of piston rod 7 for cab tilting purposes.

The lost motion connection means shown in FIG. 4 operates to allow slight relative pivotal movement between cab 2 and chassis 1 while preventing relative movement between piston rod 7 and cylinder 6 of device 4. This comes about because piston 10 is reciprocably movable in bore 9 of piston rod 7 during bouncing movement of cab 2.

FIG. 5 shows another embodiment of lost motion connection means in accordance with the invention. Piston-cylinder device 4 comprises a cylinder 6 and a piston rod 7. Between rod 7 and cylinder 6 a bearing 8 and ring 8A are provided. The end of piston rod 7 extending beyond cylinder 6 has an aperture or bore 9 which receives a small piston 10 for a piston rod 11. Piston rod 11 extends from bore 9 and is provided with, for example, a threadedly attached connecting member or fork 12A having a cylindrical hole or connection eyelet 12 which engages a cylindrical pin 15 which is provided on cab 2. Snap ring 13 is provided at the end of the bore 9 to limit outward movement of piston 10 and its piston rod 11.

A passage 47 in piston 7 communicates between the end of bore 9 and that portion chamber 48 of cylinder 6 between the end of the cylinder and piston 7A on piston rod 7. A small free hydraulic piston 50 is slidably mounted in bore 9 between piston 10 and the end of bore 9. Cylinder 6 is provided with fluid ports 44 and 45 through which hydraulic fluid enters and leaves the cylinder to effect movement of piston rod 7 for cab tilting purposes.

The lost motion connection means shown in FIG. 5 operates as follows in the system shown in FIG. 9. Assume that cab 2 is to be tilted from its over-the-road (0°) position, to full-tilt (90°) position and back again. Starting from the over-the-road (0°) position, piston 62 produces pressure at port 45 and in chamber 48 in the base end of cylinder 6. This pressure is also ported to free piston 50 through passage 47 in main piston 7. Free piston 50 is then forced outward against a small piston 10 and causes rod 11 to extend leftward (with respect to FIG. 5) due to the pressure in chamber 48. The effect of such extension of piston rod 11 is to eliminate all lost motion as soon as pressure is applied to chamber 48. The reason for removing the lost motion is to eliminate a hard flop-over of cab 2 as it passes through the 45° position. After passing the 45° position, cab 2 falls forward from the 45° point to the full-tilt (90°) position. When the operator wants to return cab 2 from full-tilt to over-the-road position, he starts applying pressure to through port 44 to pull main piston 7 inwardly. Since the rod 7 is then in tension, small piston 10 is at the extreme left side (with respect to FIG. 5) of its bore 9 and cab 2 is pulled back to the 45° point. In the hydraulic system shown in FIG. 9, fluid in chamber 48 in cylinder 6 is only able to pass out of chamber 48 through port 45 during each pump stroke. Therefore, free piston 50 cannot move freely backward in bore 9 and is retained against small piston 10. Consequently, there is no flop-over at the 45° point. From the 45° point to the over-the-road (0°) position, the weight of cab 2 acting on piston 10 will, on each pump stroke, displace a certain amount of fluid from bore 9 until small piston 10 has pushed free piston 50 to the extreme right end of bore 9. Once free piston 50 is at the extreme right end of bore 9, the weight of cab 2 acts on main piston rod 7 to move it rightward with respect to FIG. 5. Once the operation of pump piston 62 is stopped, chamber 48 of cylinder 6 is completely sealed off. Therefore, in order to obtain the desired lost motion action of cab 2 from the over-the-road position downwardly (i.e., if the cab bounces downward on its support and needs to push main piston rod 7 rightward [with respect to FIG. 5]) it is necessary, once cab 2 is in its normal over-the-road position, to give three to five additional strokes to pump piston 62. This extra pumping causes rod 7 to move back slightly from the point where it normally comes to rest when the cab 2 makes the normal descent of 45° to 0° position. This additional pumping moves rod 7 (i.e., the end of bore 9) slightly away from free piston 50 and small piston 10 so that there is a space between free piston 50 and the end of bore 9. Thus, when cab 2 bounces downward and pushes free piston 50 forward (to the right in FIG. 5) the necessary space is available.

FIG. 6 shows a very simple embodiment of lost motion connection means in accordance with the invention. Again, cylinder 6 and piston rod 7 are shown. The connecting member or fork 12A rigidly secured to the connection end of piston rod 7 is provided with an elongated slot 14 which is in engagement with a fixed cylindrical pin 15 provided on cab 2. In operation of the embodiment shown in FIG. 6, pin 15 is able to travel back and forth in slot 14 as cab 2 bounces with respect to chassis 1 but such motion is not transmitted to cause relative movement between piston rod 7 and cylinder 6.

FIG. 7 shows another form of lost motion connection means in accordance with the invention. A connecting member or sleeve 16 is provided at the connection end of piston rod 7 and is slidably mounted thereon. Sliding movement of sleeve 16 is limited by a pin 17 extending transversely from piston rod 7 and engaging an elongated aperture or slot 18 in the wall of the sleeve. The end of sleeve 16 extending beyond piston rod 7 has a cylindrical hole or connection eyelet 12 for engagement with the cylindrical pin 15 on the driver's cab 2. In operation of the embodiment shown in FIG. 7, pin 17 is able to travel back and forth in slot 14 as cab 2 bounces with respect to chassis 1 but such motion is not transmitted to cause relative movement between piston rod 7 and cylinder 6.

I claim:

1. In a truck having a chassis part and a cab part tiltably mounted thereon and movable through an overcenter position between an over-the-road position and a fully tilted position; a hydraulic device having a cylinder component and a relatively movable main piston component for adjusting the angular position of the cab part with respect to the chassis part; means for pivotably connecting one component at one end of said hydraulic device to one of said cab and chassis parts; first and second fluid ports in said cylinder on opposite sides of said main piston; and lost-motion connection means for pivotably connecting the other component at the other end of said hydraulic device to the other of said cab and chassis parts and for permitting slight relative movement between said cab part and chassis part while said cab part is in said over-the-road position and while said cylinder and main piston components remain stationary with respect to each other, said lost-motion connection means comprising a bore in said other component, a lost-motion piston slidably mounted in said bore, means on said piston component for preventing said lost-motion piston from being expelled from said bore when said cab moves through said overcenter position, and means for pivotally connecting said lost-motion piston to the other of said cab and chassis parts.

2. A truck according to claim 1 including shock absorbing means in said bore for acting upon said lost-motion piston to cushion the movement thereof relative to said other component as said cab part moves through overcenter position.

3. A truck according to claim 2 wherein said shock absorbing means comprises biasing means disposed in said bore on opposite sides of said lost-motion piston.

4. A truck according to claim 3 wherein said means for pivotably connecting said one component to said one part comprises a pin on said one part and a pin-receiving opening in said one component and wherein said means for pivotably connecting said lost-motion piston to said other part comprises a pin on said other part and a pin receiving opening in the pistor rod of said lost-motion piston.

5. In a truck having a chassis and a cab tiltably mounted thereon and movable through an overcenter position between an over-the-road position and a fully tilted position; a hydraulic device for having a cylinder and a relatively movable main piston for adjusting the angular position of the cab with respect to the chassis; means for pivotally connecting said cylinder to said chassis; first and second fluid ports in said cylinder on opposite sides of said main piston; and lost-motion connection means for pivotally connecting said main piston to said cab and for permitting slight relative movement between said cab and chassis while said cab is in said over-the-road position while said cylinder and main piston remain relatively stationary with respect to each other, said lost motion connection means comprising a bore in said main piston, a lost-motion piston slidably mounted in said bore, means on said main piston for preventing said lost-motion piston from being expelled from said bore when said cab moves through said overcenter position and means for pivotably connecting said lost-motion piston to said cab.

6. A truck according to claim 5 including a shock absorbing means in said bore for acting upon said lost-motion piston to cushion the movement thereof relative to said main piston as said cab moves through overcenter position.

7. A truck according to claim 6 wherein said shock absorbing means comprises biasing means disposed in said bore on opposite sides of said lost-motion piston.

8. A truck according to claim 7 wherein said means for pivotally connecting said cylinder to said chassis comprises a pin on said chassis and a pin-receiving opening on said cylinder and wherein said means for pivotally connecting said lost-motion piston to said cab comprises a pin on said cab and a pin-receiving opening in the piston rod of said lost-motion piston.

9. In a truck having a chassis part and a cab part tiltably mounted thereon and movable through an overcenter position; a hydraulic device having a cylinder component and a relatively movable main piston component for adjusting the angular position of the cab part with respect to the chassis part; means for pivotably connecting one component at one end of said hydraulic device to one of said cab and chassis parts; and lost-motion connection means for pivotally connecting the other component at the other end of said hydraulic device to the other of said cab and chassis parts and for permitting slight relative movement between said cab part and chassis part while said cylinder and main piston components remain stationary with respect to each other, said lost-motion connection means comprising a bore in said other component, a lost-motion piston slidably mounted in said bore, means for pivotally connecting said lost-motion piston to the other of said cab and chassis parts, and shock absorbing means in said bore for acting upon said lost-motion piston to cushion the movement thereof relative to said other component as said cab part moves through overcenter position, said shock absorbing means comprising biasing means disposed in said bore on opposite sides of said lost-motion piston, said shock absorbing means further comprising a fluid passage communicating between said cylinder component and a port in said bore and a free piston disposed in said bore between said port and said lost-motion piston.

10. A truck according to claim 9 wherein said means for pivotally connecting said one component to said one part comprises a pin on said one part and a pin-receiving opening in said one component and wherein said means for pivotally connecting said lost-motion piston to said other part comprises a pin on said other part and a pin-receiving opening in the piston rod of said lost-motion piston.

11. In a truck having a chassis and a cab tiltably mounted thereon and movable through an overcenter point; a hydraulic device having a cylinder and a relatively movable main piston for adjusting the angular position of the cab with respect to the chassis; means for pivotally connecting said cylinder to said chassis; and lost-motion connection means for pivotally connecting said main piston to said cab and for permitting slight relative movement between said cab and chassis while said cylinder and main piston remain relatively stationary with respect to each other, said lost motion connection means comprising a bore in said main piston, a lost-motion piston slidably mounted in said bore, means for pivotably connecting said lost-motion piston to said cab and shock absorbing means in said bore for acting upon said lost-motion piston to cushion the movement thereof relative to said main piston on said cab moves through overcenter position, said shock abosrbing means comprising a fluid passage communicating between said cylinder and a port in said bore and a free piston disposed in said bore between said port and said lost motion piston.

12. A truck according to claim 11 wherein said means for pivotally connecting said cylinder to said chassis comprises a pin on said chassis and a pin-receiving opening on said cylinder and wherein said means for pivotally connecting said lost-motion piston to said cab comprises a pin on said cab and a pin receiving opening in the piston rod of said lost-motion piston.

13. In a truck having a chassis and a cab tiltably mounted thereon and movable through an overcenter point; a hydraulic device having a cylinder and a relatively movable main piston for adjusting the angular position of the cab with respect to the chassis; first and second fluid ports in said cylinder on opposite sides of said main piston; means comprising a pin on said chassis and a pin-receiving opening on said cylinder for pivotally connecting said cylinder to said chassis; and lost-motion connection means for pivotally connecting said main piston to said cab and for permitting slight relative movement between said cab and chassis while said cylinder and main piston remain relatively stationary with respect to each other, said lost motion connection means comprising a bore in said main piston, a lost-motion piston slidably mounted in said bore, means on said main piston for preventing said lost-motion piston from being expelled from said bore, and means comprising a pin on said cab and a pin-receiving opening in the piston rod of said lost-motion piston for pivotably connecting said lost-motion piston to said cab and shock absorbing means in said bore for acting upon said lost-motion piston to cushion the movement thereof relative to said main piston as said cab moves through overcenter position, said shock absorbing means comprising biasing means disposed in said bore on opposite sides of said lost-motion piston.

* * * * *